Patented Dec. 22, 1936

2,065,418

UNITED STATES PATENT OFFICE 2,065,418

WATER-SOLUBLE METAL COMPLEX COMPOUNDS OF THE IMIDAZOLE SERIES

Hans Andersag, Wuppertal-Elberfeld, and Heinrich Jung, Wuppertal-Vohwinkel, Germany, assignors to Winthrop Chemical Company, Inc., New York, N. Y., a corporation of New York No Drawing. Application July 23, 1932, Serial No. 624,360. In Germany July 29, 1931

10 Claims. (Cl. 260—11)

This invention relates to water-soluble metal complex compounds of the imidazole series and to a process of preparing the same.

It is known that imidazole compounds, such as benzimidazole, can be combined with certain heavy metals to form complex compounds. These known imidazole metal complex compounds are insoluble in water. Due to this property the said complex compounds have not achieved a practical importance and have been of a more scientific interest.

We have now found that water-soluble stable imidazole metal complex compounds can be prepared by reacting with an oxide or hydroxide of a heavy metal selected from the group consisting of gold, silver, mercury and copper upon such imidazole compounds, the imidazole nucleus of which is combined with an aromatic, that is a carbocyclic or heterocyclic nucleus of aromatic character, containing at least one substituent capable of forming salts with bases or acids. The metal complex compounds thus obtainable can be neutralized in aqueous solution without being decomposed by the neutralizing process. The neutral salts display a remarkable activity in the treatment of infectious diseases and yield about neutrally reacting aqueous solutions suitable for injection purposes.

In the complex forming imidazole component of our new metal complex compound the aromatic or heterocyclic nucleus combined with the imidazole ring and containing at least one substituent capable of forming salts is preferably a benzene nucleus which is condensed with the imidazole ring to the benzimidazole ring system. Other aromatic carbocyclic or heterocyclic nuclei which may be combined with the imidazole nucleus are, for instance, naphthalene, pyridine, quinoline, isoquinoline. These nuclei may either form a condensed ring system with the imidazole as in the above-mentioned benzimidazole ring system or may be simple substituents of the imidazole ring.

The substituents of the aromatic nuclei, which are capable of forming salts, may be basic or acid groups. Suitable acid substituents are, for example, the sulfo, carboxylic, sulfoxylic, arsinic, stibinic acid group and radicals of organic acids, such as acetic-, amino acetic-, hydroxy acetic-, thioacetic-, propionic-acid and the like. Suitable basic substituents are organic radicals containing nitrogen, such as aminoalkyl or aminocycloalkyl groups, for instance, the aminomethyl, diethylaminoethyl, dimethylaminoethoxy and aminocyclohexyl group, or heterocyclic radicals, for example, the pyridyl, piperidyl, and quinolyl group. These basic radicals may be connected with the aromatic nucleus substituting the imidazole ring directly or by means of an etherlike bound oxygen or sulfur atom or an amino group.

Since our present invention is concerned with the manufacture of products displaying a therapeutic activity, we have selected for the production of our new complex compounds the metals gold, silver, mercury and copper which belong to that group of metals well-known in the art by a certain therapeutic effect.

We do not know for certain in what particular manner the metal is combined with the imidazole component in our new complex compounds. Since the metal can no longer be detected therein in the ionic state, for instance, when rendering the aqueous solutions of our new metallic compounds alkaline, the metal must be combined with the imidazole compound in a complex state, whereas the acid or basic substituent capable of forming salts combines with the base, with the acid, respectively, in the neutralizing process. As a term suitable to explain the properties of our new complex compounds may be considered the following structural formula of a neutral benzimidazole gold complex compound:

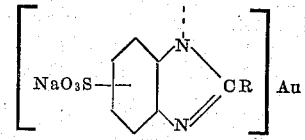

R being hydrogen, an alkyl group or a radical which may contain a group capable of forming salts.

It may be mentioned that our new complex compounds are not limited as might be understood when considering the above formula to such compounds wherein the imidazole and the metal component are present in stoichiometric proportions. Rather such compounds wherein more than one gram molecule of the imidazole component is contained upon one gram atom of the metal component, have proved especially suitable for the therapeutic use of our new compounds. Obviously, in such cases more than one molecule of the imidazole compound participate in saturating the valences of one metal atom.

In accordance with our present invention the new imidazole complex metal compounds are obtained by reacting upon an imidazole which is combined with an aromatic carbocyclic or heterocyclic nucleus containing at least one substituent capable of forming salts with an oxide or hydroxide of a heavy metal of the group consisting of gold, silver, mercury and copper and neutralizing the reaction mixture. The imidazole compounds may be used in the said process in the form of their neutral salts. The metal oxide or metal hydroxide may be used in the nascent state by employing simultaneously a metal salt or a metal double salt and an alkaline reacting medium, such as alkali metal hydroxides, ammonia and amines. The reaction is performed in aqueous solution or suspension. Water-soluble metal salts should, therefore, be used when employing the metal salts for the reaction. The reaction is completed by neutralizing the reaction mixture by the addition of an acid, such as an organic acid, for example, formic acid, acetic acid, lactic acid, tartaric acid, or a mineral acid, for example, hydrochloric acid, sulfuric acid, nitric acid, or by the addition of a base, such as an inorganic base, for example, a hydroxide of an alkali or earth alkali metal, further of ammonia or of its organic substitution products, such as monomethylamine, diethylamine, di- and tri-ethanolamine, diethylamino-ethanol. Thereafter the metal complex compound formed can be separated from the mixture by pouring the latter into precipitating agents. Precipitating agents particularly suitable for our present process are organic liquids miscible with water, such as methyl alcohol, ethyl alcohol, acetone or mixtures thereof. The above described process may be employed for the use of imidazole compounds containing an acid salt forming group as well as for the use of imidazole compounds containing a basic salt forming group.

Another method of preparing our new metal complex compounds consists in first producing in accordance with the usual methods a metal complex compound of an imidazole which is combined with an aromatic carbocyclic or heterocyclic nucleus, but does not contain the above mentioned group which is capable of forming salts, and thereafter introducing into the metal complex compound formed, which is insoluble or sparingly soluble in water, a substituent capable of forming salts. The salt forming substituent may be directly introduced or by conversion of substituents which are already present in the complex compound, for example, by saponification of a carboxylic acid ester group.

Our new complex compounds are further obtainable by subjecting to the imidazole synthesis organic metallic complex compounds or organic metal salts the organic component of which does not yet contain the imidazole ring, but contains substituents suitable for the formation of the imidazole ring and contains at least one substituent capable of forming salts. For example, a metal complex compound or metal salt of an aromatic or heterocyclic 1.2-diamine containing at least one substituent capable of forming salts apart from the amino groups, may be transformed into an imidazole compound by the action of formic acid, acetic acid or the like.

When preparing our metal complex compounds it has proved advisable to use an excess of the complex-forming imidazole compound.

Our invention may be further described by the following examples, but is not limited to the specific processes and products described therein:

Example 1

A solution of 4 grams of potassium gold chloride in 10 ccs. of water is added while stirring to a solution of 6.5 grams of benzimidazole-4-sulfonic acid in 6 ccs. of 5 normal caustic soda and 10 ccs. of water, the reaction mixture is neutralized by means of 5 normal caustic soda and poured into alcohol. The sodium salt of the gold benzimidazole-4-sulfonic acid is obtained as a light yellow powder, soluble in water with a neutral reaction.

The reaction proceeds in accordance with the following probable equation:

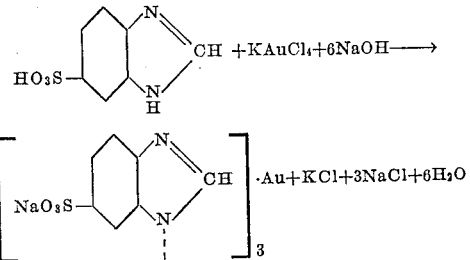

Example 2

A solution of 0.85 gram of crystalline cupric chloride in 5 ccs. of water is added to a solution of 2 grams of benzimidazole-4-sulfonic acid in 2 ccs. of 5 normal caustic soda, and 10 ccs. of water, the reaction mixture is neutralized with caustic soda and poured into alcohol. The sodium salt of the copper benzimidazole-4-sulfonic acid forms a light blue powder, very readily soluble in water.

Example 3

1.7 grams of benzimidazole-4-carboxylic acid are dissolved in 4 ccs. of 5 normal caustic soda and 10 ccs. of water, a solution of 1.1 grams of crystallized gold chloride in 5 ccs. of water is added, the reaction mixture is neutralized with caustic soda and poured into alcohol. The sodium salt of gold benzimidazole-4-carboxylic acid is obtained in the form of a yellow powder, readily soluble in water.

Example 4

Freshly precipitated silver oxide obtained by precipitating a solution of 3.4 grams of silver nitrate in 50 ccs. of water by means of an excess of caustic soda at ordinary temperature is heated with a suspension of 4 grams of benzimidazole-4-sulfonic acid in 30 ccs. of water until complete solution has occurred. The resulting silver-benzimidazole-4-sulfonic acid is neutralized by means of alkalies or nitrogen bases and the salt obtained is separated in the customary manner.

Example 5

A solution of 4 grams of gold potassium chloride in 10 ccs. of water is added to a solution of 6 grams of benzimidazole-4-hydroxy acetic acid in 6 ccs. of 5 normal caustic soda and 10 ccs. of water. After neutralizing by means of caustic soda the solution is poured into absolute alcohol, whereby the sodium salt of the gold benzimidazole-4-hydroxy-acetic acid is precipitated as a light red powder, readily soluble in water.

Example 6

5.8 grams of benzimidazole-4-amino acetic acid are dissolved in 6 ccs. of 5 normal caustic soda and 4 ccs. of water, the solution is cooled and a solution of 4 grams of gold potassium chloride in 10 ccs. of water is slowly added during further cooling. The resulting precipitate is dissolved by means of caustic soda and the neutralized solution is poured into alcohol. The sodium salt of the gold benzimidazole-4-amino acetic acid forms a reddish grey powder, soluble in water with a neutral reaction.

Example 7

A solution of 4 grams of gold potassium chloride in 7 ccs. of water is added to a solution of 5.3 grams of benzimidazole-4-acetic acid in 6 ccs. of 5 normal caustic soda. The resulting precipitate is pulverized, neutralized by means of 5 normal caustic soda and the sodium salt of the gold benzimidazole-4-acetic acid is precipitated by pouring the solution into absolute alcohol. A yellowish red powder is obtained, readily soluble in water.

Example 8

A solution of 1.7 grams of silver nitrate in 20 ccs. of water is added while stirring to a solution of 3.4 grams of the sodium salt of benzimidazole-4-arsonic acid (mono) in 20 ccs. of water. The precipitate formed is filtered with suction, washed with water, alcohol and ether and dried. The silver benzimidazole-4-arsonic acid forms a white amorphous powder, which is transformed into the corresponding salt by means of alkalies or nitrogen bases.

The sodium salt of the gold benzimidazole arsonic acid produced in an analogous manner from 7.3 grams of benzimidazole-4-arsonic acid and 4 grams of gold potassium chloride neutralizing with 5 normal caustic soda and pouring the solution into 300 ccs. of dry alcohol is a yellow powder, readily soluble in water.

Example 9

A concentrated solution of 2.5 grams of mercuric chloride is added while stirring to a solution of 4 grams of benzimidazole-4-sulfonic acid in 20 ccs. of normal caustic soda. The precipitate formed is neutralized by means of 5 normal caustic soda and the solution is poured into alcohol. The sodium salt of the mercuric benzimidazole-4-sulfonic acid forms a white powder, readily soluble in water.

Example 10

A solution of 5.3 grams of crystallized cupric chloride is added to a solution of 11.3 grams of 3.4-diaminobenzenesulfonic acid in 40 ccs. of water and 60 ccs. of normal caustic soda. The copper salt formed is filtered by suction and washed. Thereafter it is heated to boiling for some 6 hours under a reflux condenser with 100 ccs. of formic acid, the formic acid is then distilled off and the residue is dissolved by means of water and caustic soda. The sodium salt of the copper benzimidazole-4-sulfonic acid formed in accordance with the following probable equations:

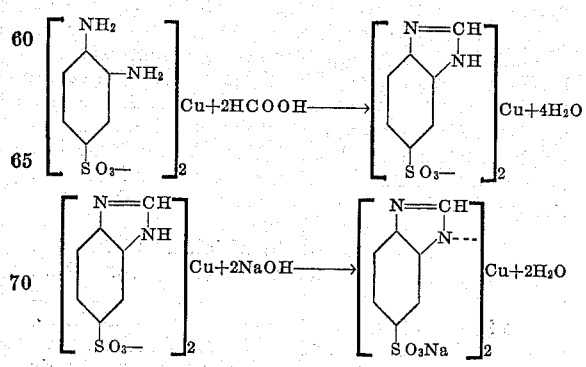

is precipitated by pouring the solution into alcohol. It forms a light blue powder, readily soluble in water and displays the same properties as the compound of Example 2.

Example 11

3.6 grams of the hydrochloride of μ-diethyl-aminopropyl-4-phenoxybenzimidazole are dissolved in 40 ccs. of water and a solution of 1.7 grams of silver nitrate in 10 ccs. of water is added while stirring, whereupon the silver base precipitates. It is washed with water and dried. The silver μ-diethylaminopropyl-4-phenoxybenzimidazole forms a light yellow powder, readily soluble in acetic acid, sulfuric acid or nitric acid.

Example 12

One part by weight of copper-benzimidazole-4-carboxylic acid ethyl ester is heated on the water bath for some time with about 5 ccs. of 25% hydrochloric acid, the mixture is rendered alkaline by means of caustic soda, again acidified by means of hydrochloric acid and finally neutralized with caustic soda. By pouring the solution into alcohol the sodium salt of the copper benzimidazole carboxylic acid precipitates. It forms a blue powder, soluble in water.

Example 13

2 parts by weight of copper benzimidazole-4-carboxylic acid ethyl ester and 10 parts by weight of diethylaminoethanol are heated to 120–140° C. for 5 hours and the excess of diethylaminoethanol is distilled off at 200° C. The residue is dissolved by means of dilute hydrochloric acid and precipitated by means of ammonia. The copper benzimidazole-carboxylic acid-diethylaminoethanol-ester is thus obtained as a grey powder, soluble in dilute hydrochloric acid.

Example 14

19 parts by weight of 3.4-diaminobenzenesulfonic acid, 7.6 parts by weight of anhydrous copper formate and 100 parts by weight of formic acid are boiled for 3 hours under reflux. The formic acid is then distilled off in vacuo, the residue is suspended in 60 parts of water and neutralized by means of 20% caustic soda. The filtered solution is poured into 500 ccs. of alcohol. The sodium salt of copper benzimidazole-4-sulfonic acid, which separates, displays the properties indicated in Example 2.

Example 15

11.8 grams of benzimidazole, 8 grams of anhydrous copper sulfate and 50 grams of concentrated sulfuric acid are heated for 2 hours at 170–180° C. After the reaction is complete the solution is diluted by means of 500 grams of water and neutralized while boiling with barium carbonate. After cooling the blue colored aqueous solution is separated from the barium sulfate and 5.3 grams of anhydrous sodium carbonate are added. The barium carbonate precipitated is removed by filtration and the aqueous solution is evaporated to dryness; the residue forms the sodium salt of copper benzimidazole-4-sulfonic acid. It shows the properties described in Example 2.

Example 16

21.6 parts by weight of ortho-phenylene-diamine, 38 parts by weight of ω-diethylaminobutyric acid ethyl ester and 16 parts by weight of anhydrous copper sulfate are heated to 190° C. for 12 hours with a reflux condenser. 50 parts of water and 12 parts by weight of concentrated hydrochloric acid are added to the residue, the whole is filtered after the residue has dissolved and rendered alkaline by means of ammonia. The precipitate is filtered with suction, washed with water and dried. A dark red amorphous powder is obtained. It is insoluble in water, but soluble in acetic acid and mineral acids.

*Example 17*

10.8 grams of ortho-phenylenediamine and 23 grams of 2-methyl-4-quinoline carboxylic acid ethyl ester are heated to 220° C. for 15 hours. Any unchanged starting material is distilled off in vacuo and the residue is recrystallized from alcohol. The resulting $\mu$-(2-methyl-4-quinolyl)-benzimidazole forms white crystals, melting at 230° C. and soluble in dilute acids.

1.7 grams of silver nitrate are dissolved in 10 ccs. of alcohol and 5 ccs. of 20% ammonia and a solution of 2.6 grams of $\mu$-(2-methyl-4-quinolyl)-benzimidazole in 30 ccs. of alcohol is added. The precipitated silver-$\mu$-(2-methyl-4-quinolyl)-benzimidazole becomes crystalline after short heating and readily dissolves in dilute mineral acids.

*Example 18*

A solution of 2.33 grams of 4-$\omega$-diethyl-aminoethoxybenzimidazole (obtained by alkylation of 4-hydroxybenzimidazole in alkaline solution by means of diethylaminoethyl chloride, boiling point 210° C. at a pressure of 1.5 mms.) in 20 ccs. of alcohol is poured into a solution of 1.7 grams of silver nitrate in 10 ccs. of alcohol and 5 ccs. of 20% ammonia. The greater part of the alcohol is then distilled off and water is added, when the silver 4-($\omega$-diethylaminoethoxy)-benzimidazole is precipitated as a white powder. It is readily soluble in dilute acids.

*Example 19*

9 grams of benzimidazole-sulfo-carboxylic acid (prepared by sulfonation of benzimidazole-4-carboxylic acid) are dissolved in 50 ccs. of water and 6 ccs. of 5 normal caustic soda, a solution of 3.7 grams of gold trichloride hydrochloric acid in 10 ccs. of water is added, the mass is rendered faintly alkaline with 5 normal caustic soda, heated on the water bath until solution has occurred, and poured into 400 ccs. of dry alcohol. The resulting sodium salt of the gold benzimidazole-sulfo-carboxylic acid forms a yellow powder, readily soluble in water.

In the same manner the sodium salts of the gold-1.2-naphthimidazole-4-sulfonic acid and the gold benzimidazole-4-stibinic acid can be obtained. These compounds are light yellow powders easily soluble in water with a nearly neutral reaction.

*Example 20*

7.8 grams of quinolylimidazolethioglycolic acid are dissolved in 10 ccs. of water and 6 ccs. of 5 normal caustic soda, a solution of 3.8 grams of gold chloride hydrochloric acid in 5 ccs. of water and neutralized in 5 normal caustic soda is added. The solution is then poured into alcohol. The resulting product is a green amorphous powder, readily soluble in water.

*Example 21*

6.3 grams of pyridimidazolethiogycolic acid are dissolved in 10 ccs. of water and 6 ccs. of 5 normal caustic soda, a solution of 3.8 grams of gold chloride hydrochloric acid in 5 ccs. of water is added and the precipitate formed is dissolved in 5 normal caustic soda. The neutralized solution is poured into alcohol. It forms a yellow amorphous powder, readily soluble in water.

*Example 22*

7.6 grams of 1.2-naphthimidazole-4-sulfonic acid are dissolved in 15 ccs. of water and 6 ccs. of 5 normal caustic soda, a solution of 3.8 grams of gold chloride hydrochloric acid in 5 ccs. of water is added, the mass is neutralized with aqueous caustic soda lye, heated, and poured into alcohol. The sodium salt of the gold naphthimidazolesulfonic acid formed is a yellow powder, readily soluble in water.

*Example 23*

8.7 grams of benzimidazole-stibinic acid are dissolved in 10 ccs. of water and 12 ccs. of 5 normal caustic soda, a solution of 3.7 grams of gold chloride hydrochloric acid in 8 ccs. of aqueous caustic soda lye is added, the mass is heated on the water bath until solution has occurred, filtered and poured into alcohol. The sodium salt of gold benzimidazole-stibinic acid formed is a light yellow powder, being readily soluble in water.

While we have described our invention in great detail and with respect to preferred forms and embodiment thereof, we do not desire to be limited to such details, forms and embodiments, since it is obvious for those skilled in the art that many changes and modifications may be made in the invention embodied in other forms without departing from the spirit and scope thereof in its broader aspects. We therefore, desire to cover all forms and modifications of any one or more of the appended claims. Particularly we wish to emphasize that the term "oxide of a heavy metal" used in the appended claims is intended to include the metal oxides and their hydrates as well as the metal oxides or hydroxides formed in the nascent state when using salts of the specified metals in the presence of alkaline reacting media, such as alkalies, ammonia and amines. The term "aromatic nucleus" is used in the following claims as including carbocyclic and heterocyclic nuclei of aromatic character.

We claim:

1. The process which comprises reacting upon a benzimidazole substituted in the benzene nucleus by at least one acid substituent other than sulfhydryl groups connected to the imidazole nucleus but capable of forming salts with bases with a hydroxide of a heavy metal of the group consisting of gold, mercury and copper, and neutralizing the reaction mixture by means of an alkali metal hydroxide.

2. Complex compounds in which a radical of a heavy metal selected from the group consisting of gold, silver, mercury and copper, is connected to the imide group of an imidazole which is combined with an aromatic nucleus containing at least one substituent capable of forming salts, said complex compounds yield in the form of their neutralized salts about neutrally reacting aqueous solutions which are suitable for injection purposes and display a therapeutic activity in the treatment of infectious diseases.

3. Complex compounds in which a radical of a heavy metal selected from the group consisting of gold, silver, mercury and copper, is connected to the imide group of a benzimidazole containing in the benzene nucleus at least one substituent capable of forming salts, said complex compounds yield in the form of their neutralized salts about neutrally reacting aqueous solutions which are suitable for injection purposes and display a therapeutic activity in the treatment of infectious diseases.

4. Complex compounds in which a radical of a heavy metal selected from the group consisting of gold, silver, mercury and copper, is connected to the imide group of a benzimidazole containing in the benzene nucleus at least one acid substituent capable of forming salts, said complex compounds yield in the form of their neutral salts about neutrally reacting aqueous solutions which are suitable for injection purposes and display a therapeutic activity in the treatment of infectious diseases.

5. Complex compounds in which a radical of a heavy metal selected from the group consisting of gold, silver, mercury and copper, is connected to the imide group of a benzimidazole containing in a benzene nucleus at least one acid substituent neutralized by an alkali metal hydroxide, said complex compounds yield about neutrally reacting aqueous solutions which are suitable for injection purposes and display a therapeutic activity in the treatment of infectious diseases.

6. Complex compounds in which a radical of a heavy metal selected from the group consisting of gold, silver, mercury and copper, is connected to the imide group of a benzimidazole containing in the benzene nucleus at least one basic substituent capable of forming salts with acids, said complex compounds yield in the form of their neutral salts about neutrally reacting aqueous solutions which are suitable for injection purposes and display a therapeutic activity in the treatment of infectious diseases.

7. Complex compounds in which a radical of a heavy metal selected from the group consisting of gold, silver, mercury and copper, is connected to the imide group of a benzimidazole containing in the benzene nucleus at least one basic substituent neutralized by a mineral acid, said complex compounds yield about neutrally reacting aqueous solutions which are suitable for injection purposes and display a therapeutic activity in the treatment of infectious diseases.

8. The sodium salt of gold-benzimidazole-4-sulfonic acid which is a light yellow powder and dissolves in water to a neutral solution.

9. The sodium salt of gold-benzimidazole-4-arsonic acid which is a yellow powder and dissolves in water to a neutral solution.

10. The sodium salt of gold-benzimidazole-4-carboxylic acid which is a yellow powder and dissolves in water to a neutral solution.

HANS ANDERSAG.
HEINRICH JUNG.